Oct. 26, 1943.　　　R. J. SHAW ET AL　　　2,332,816
DECORATIVE DEVICE FOR FOOD DISPLAYS
Filed April 10, 1941
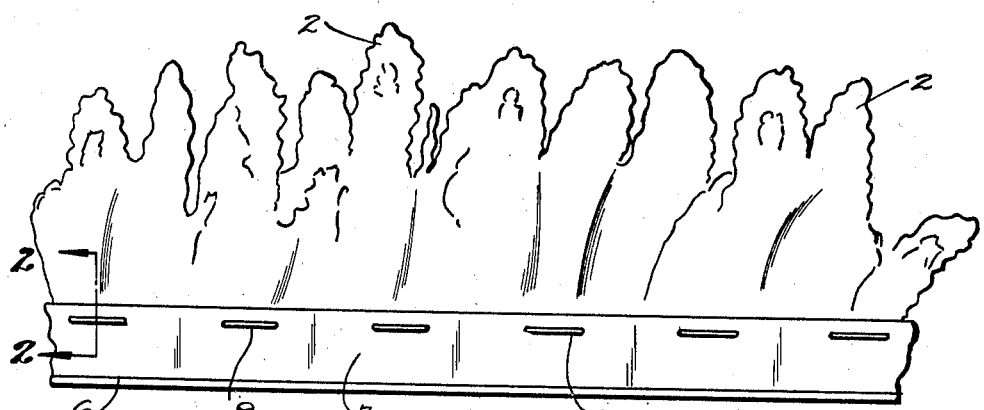
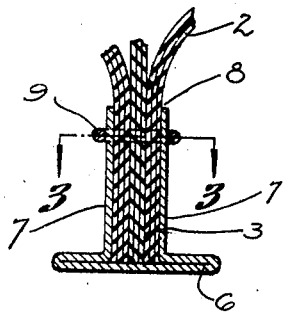
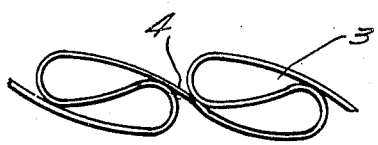
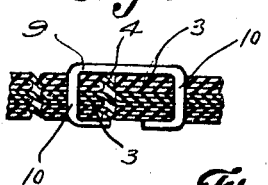
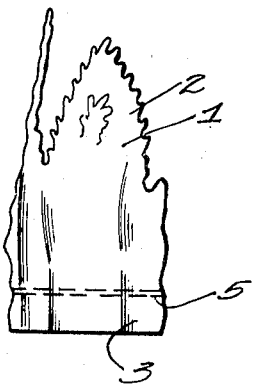
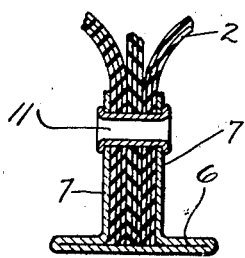
INVENTORS.
ROBERT J. SHAW.
JOHN R. SLAVSKY.
By Samuel Wissman, Attorney Patented Oct. 26, 1943

2,332,816

UNITED STATES PATENT OFFICE 2,332,816

DECORATIVE DEVICE FOR FOOD DISPLAYS

Robert J. Shaw and John R. Slavsky, Detroit, Mich.

Application April 10, 1941, Serial No. 387,884

4 Claims. (Cl. 41—13)

The present invention pertains to a novel garnishing device for display of food and particularly meats in a show case.

It is customary to display the meats in trays, and fabricated garnishing devices in the nature of imitation leaf or parsley in strip form is now being used as an insert between the trays. The general advantage of imitation greens is that they need not be replaced with fresh material at frequent intervals but need only be washed from time to time.

These garnishing devices consist generally of green rubber sheeting folded and trimmed to resemble leaves and held in an elongated metal clip. The matter of securing the rubber in the clip has received considerable attention in the prior art and has led to various complicated constructions. Even at the present time they are not altogether satisfactory. In changing the display or otherwise handling the devices, the clerk or store-keeper lifts them by pulling on the rubber leaf rather than taking hold of the base clip. Repeated handling of this character pulls the rubber out of the clip.

One of the objects of the present invention is to secure the rubber portion in the base member in such a manner that it neither pulls out nor tears. This is accomplished by the use of independent fastening members passed through the base member and the rubber in such a manner as to penetrate the latter where it is pleated and has the greatest strength. There is a possibility that a small number of the fasteners will pass through the single ply parts of the rubber material between pleats, but the spacing of the fasteners with respect to the lengthwise spacing of the pleats is such that all but very few of the fasteners will pass through the multiple ply thickness. In the preferred construction, staples are used as fasteners and their length is so determined that one end of every staple must pass through a multiple ply thickness.

Another problem in connection with such garnishing devices is the matter of supporting them in an upright position. Formerly, each strip was supported by being clamped between adjacent trays, but this required precise positioning of the trays and did not provide for laying the material at the outer edges or borders of the display. Various holders have been proposed, into which the original structure is to be supported, but these add to the cost and to the difficulty in handling.

In this connection another object of the invention is to provide a unitary structure that is self-supporting and requires no separate supporting member. More specifically, the member holding the rubber sheeting is of inverted T-shape, wherein the head constitutes a supporting base and the stem or vertical portion is of two-ply metal to receive the rubber sheeting. The fasteners mentioned above are passed through the stem portion.

The invention is fully disclosed by way of example in the following description and in the accompanying drawing in which:

Figure 1 is a side elevation of the device;

Figure 2 is the section on the line 2—2 of Figure 1;

Figure 3 is the section on the line 3—3 of Figure 1;

Figure 4 is an end view of the pleated material in loose condition;

Figure 5 is a fragmentary elevation of the rubber material before insertion in the base; and Figure 6 is a vertical cross-section of a modification.

Reference to these views will now be made by use of like characters which are employed to designate corresponding parts throughout.

The material that constitutes the imitation leaf or greens is illustrated more clearly in Figures 4 and 5. It consists of rubber sheeting 1 in strip form suitably scalloped and notched along one edge, or otherwise shaped, to resemble leaves 2. The other longitudinal edge is pleated at 3, each pleat preferably constituting three plies or thicknesses, as illustrated in Figure 4. The spacing 4 between pleats is practically negligible, especially when the pleats are pressed, for a purpose that will presently be stated. The pleating is maintained by means of stitching 5 across the same or lengthwise of the strip 1, as shown in Figure 5.

The retaining member for the rubber portion is an elongated metal piece of inverted T-shape in cross-section, comprising a flat horizontal or base portion 6 and a vertical or stem portion 7 extending upwardly therefrom.

The T-formation is finally of double thickness, as shown in Figure 3, so that it can be shaped from a single continuous thickness of metal without welding or otherwise fastening the parts together. The two thicknesses are preferably compressed together at the base 6 but spaced apart at the stem portion 7 as indicated by the numeral 8 in Figure 3, to receive the imitation leaf material.

To achieve a luxuriant and realistic appearance in the finished article, three pleated strips 1 are laid in juxtaposition and inserted in the space 8. They are held in the stem portion 7 preferably by means of wire staples driven therethrough.

It has been stated above that the spacing between adjacent pleats 3 is negligible. In fact it may be zero, but due to imperfect fabrication, a small space may occur between some of the pleats. For the purpose of obtaining the most secure anchorage of the rubber material, it is preferable that the ends of the staples pass through the triple ply pleats rather than through the single thickness at the spaces 4. With this object in view, the staples are so dimensioned that their length between the penetrating portions thereof is unequal to the width of a pleat or any multiple of that width. Consequently, if one of the prongs 10 of a staple passes through a single ply thickness 4, the other prong must pass through the triple ply pleat of the same strip 1. This is obviously true of each of the juxtaposed strips 1, and the provision of a plurality of strips reduces the probability that any one prong 10 will pass through more than one single thickness 4.

In the modification shown in Figure 6, eyelets or rivets 11 are employed instead of the staples as fastening means. These rivets are spaced in the same relation as the prongs 10, that is, a distance unequal to the width of the pleats or a multiple thereof.

In either construction, a firm anchorage of the rubber material in the supporting member is obtained. Moreover, the staples or the rivets are inserted by means of simple mechanical devices and without the necessity of special formations of the rubber material or the base structure as in earlier proposals for the purpose of obtaining secure anchorage.

The device is capable of standing firmly on the base portion 6, and this also without special attachment as in prior devices. This results from the inverted T-shape of the base with spaced walls in the stem to receive the rubber strips.

Although specific embodiments of the invention have been illustrated and described, it will be understood that various alterations in the details of construction may be made without departing from the scope of the invention as indicated by the appended claims.

What we claim is:

1. A decorative device for food displays comprising a retaining member having spaced walls, simulated leaf material in sheet form having successive pleats along one edge received between said walls, and fastening members passed through said walls and material and spaced apart a distance unequal to the width of said pleats or a multiple thereof.

2. A decorative device for food displays comprising a retaining member having spaced walls, simulated leaf material in sheet form having substantially contiguous pleats along one edge received between said walls, and fastening members passed through said walls and material and spaced apart a distance unequal to the width of said pleats or a multiple thereof.

3. A decorative device for food displays comprising a retaining member having spaced walls, simulated leaf material in sheet form having successive pleats along one edge received between said walls, and staples passed through said walls and material, the penetrating parts of said staples being spaced apart a distance unequal to the width of said pleats or a multiple thereof.

4. A decorative device for food displays comprising an elongated inverted T-shaped member having spaced vertical walls, simulated leaf material in sheet form having successive pleats along one edge received between said walls, and fastening members passed through said walls and material and spaced apart a distance unequal to the width of said pleats or a multiple thereof.

ROBERT J. SHAW.
JOHN R. SLAVSKY.